UNITED STATES PATENT OFFICE 2,398,757

PREPARATION OF CYANOACETALS

Donald John Loder and Walter Martin Bruner, Wilmington, Del., assignors to E. I. du Pont de Nemours & Company, Wilmington, Del., a corporation of Delaware No Drawing. Application February 14, 1942, Serial No. 430,994

8 Claims. (Cl. 260—464)

This invention relates to cyanoacetals and to their preparation from acetals and cyanohydrins and more particularly from formals and cyanohydrins.

An object of the present invention is to provide new chemical products which are generically called cyanoacetals. Another object is to provide a process for their preparation. Yet another object is to provide a process for their preparation from the interaction of aldehyde and/or ketone acetals with ketone and/or aldehyde cyanohydrins. Still another object is to provide reaction conditions under which the process can be successfully carried out. Other objects and advantages of the invention will hereinafter appear.

The reaction is effected by mixing the acetal and cyanhydrin in the presence of a suitable acidic type catalyst such, for example, as sulfuric acid, hydrochloric acid, phosphoric acid, boron fluoride and its addition products, para-toluene sulfonic acid and the like and heating the resulting mixture to a temperature from room temperature to approximately 300° C. In many instances, however, no heating is necessary as the reaction proceeds at room temperatures down to in the neighborhood of 0° C. Pressures may be employed if desired ranging from atmospheric to 100 atmospheres or more, although for normal operation pressures above atmospheric are not necessary. In order to force the reaction to completion it is preferable to remove from the reaction zone the alcohol produced, this may be done continuously or intermittently as desired. Subsequent to the reaction the catalyst is preferably neutralized with either an organic or inorganic base such as, for example, sodium hydroxide, sodium carbonate, sodium methoxide, pyridine, or the like and the products distilled for the recovery of the cyanonitrile.

Generically the reaction may be illustrated as proceeding in accord with the equation:

1. 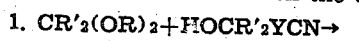

in which R is an alkyl or substituted alkyl group, R' is hydrogen, an alkyl or substituted alkyl group, and Y is a single bond or an alkyl group; the alcohol being removed by distillation as formed. More specifically the reaction may be illustrated by the preparation of (methoxymethoxy) acetonitrile in accord with the equation:

2. 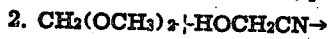

While the reaction proceeds primarily between one mole of the acetal and one mole of the cyanohydrin, nevertheless a reaction likewise takes place between one mole of the acetal and two moles of the cyanhydrin to give two moles of alcohol and one mole of a dinitrile.

The invention provides a method for the preparation of cyanoacetals and more specifically symmetrical and unsymmetrical cyanoalkylacetals by the interaction of the cyanohydrins and their equivalents listed in the following paragraph with the acetals and their equivalents listed herewith. As examples of suitable acetals may be designated the symmetrical acetals which may be prepared by reacting formaldehyde or a higher aldehyde such as acetaldehyde, normal and isopropionaldehyde, normal and isobutyraldehyde with an alcohol, such, for example, as methanol, ethanol, normal and isopropanol, normal and isobutanol and the higher alcohols such as nonyl, decyl, cyclohexyl and like straight and branched chained alcohols. The above acetals are primarily of the symmetrical type, unsymmetrical acetals, however, may likewise be employed such, for example, as methyl ethyl formal, (methoxy-methoxy) ethanol, methyl ethyl acetal, methyl propyl formal, ethyl propyl formal, methyl propyl acetal, and the like. Acetals of the type made from ketones and alcohols, sometimes called ketals, may likewise be used and as examples of these compounds which may be employed are those prepared by the interaction of ketones such as acetone, methyl ethyl ketone, diethyl ketone, and the higher symmetrical and unsymmetrical ketones with the alcohols designated above, the cyclic formals and their polymers likewise may be used such, for example, as 1,3-dioxolane, polymeric 1,3-dioxolane, glycol polyformals, 1,3-dioxane and their substitution products.

The above designated acetals may be reacted with such cyanohydrins and their equivalents, as, for example, those prepared by the interaction of hydrocyanic acid with the aldehydes generally, such as formaldehyde, acetaldehyde, normal and isopropionaldehyde, normal and isobutyraldehyde and the higher aldehydes. Ketone cyanohydrins are likewise suitable and as examples of these compounds may be designated those prepared by the interaction of hydrocyanic acid with acetone, methyl ethyl ketone, diethyl ketone, cyclohexanone and the high symmetrical and unsymmetrical ketones. Hydroxyacid nitriles which may be called glycol cyanohydrins may also be used such, for example, as ethylene glycol cyanohydrin, HOCH₂CH₂CN; propylene glycol cyanohydrin, HOCH₂CH₂CH₂CN; etc.

The more detailed practice of the invention is illustrated by the following examples in which parts are by weight unless otherwise stated.

*Example 1.*—A mixture consisting of 228 parts of formaldehyde cyanohydrin, 1648 parts of methylal (as a methanol azeotrope containing 8% methanol and 92% methylal) and 10 parts of sulfuric acid was boiled five hours. Catalyst was neutralized, as indicated by phenolphthalein, by the addition of NaOCH₃ and the product was distilled. 110 parts of the product (methoxymethoxy) acetonitrile CH₃OCH₂OCH₂CN, a colorless, mobile liquid with a B. P. 66° C./23 mm. was obtained.

*Example 2.*—Two moles of isobutyraldehyde cyanohydrin was reacted with 3 moles of isobutyl formal in the presence of 0.1 mole of sulfuric acid. The resulting mixture was heated to a temperature in the neighborhood of 100° C. for five hours, subsequent to which sodium methoxide was added to neutralize the catalyst and until the solution was neutral as indicated by phenolphthalein. An 81.4% conversion of alpha(isobutoxymethoxy) isovaleronitrile,

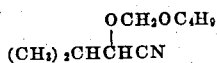

(CH₃)₂CHCHCN was obtained. It is a white, water-immiscible oil, boiling point 67° C. at 2 mm.

*Example 3.*—A reaction mixture consisting of 114 parts of formaldehyde cyanohydrin, 320 parts of diisobutyl formal and 2 parts of sulfuric acid was fractionated until no more isobutanol distilled from the mixture. After neutralizing the mixture with sodium hydroxide, using litmus as the indicator, fractionation was continued. The (isobutoxymethoxy) acetonitrile, (CH₃)₂CHCH₂OCH₂OCH₂CN fraction, obtained in 83.3% yield, boiled at 50° at 3 mm.

*Example 4.*—A reaction mixture consisting of 114 parts of formaldehyde cyanohydrin, 320 parts of diisobutyl formal and 2 parts of sulfuric acid was fractionated until no more isobutanol distilled from the mixture. After neutralizing the mixture with sodium hydroxide, using litmus as the indicator, fractionation was continued. The (cyanomethoxymethoxy) acetonitrile

NCCH₂OCH₂OCH₂CN fraction obtained in 10% yield, boiled at 110° at 2 mm.

*Example 5.*—A reaction mixture consisting of 228 parts of formaldehyde cyanohydrin, 541 parts of diethyl formal and 2 parts of sulfuric acid was fractionated until the binary of diethyl formal and ethanol stopped distilling from the mixture. After neutralizing the mixture, as described above, fractionation was continued. The ethoxymethoxy acetonitrile, C₂H₅OCH₂OCH₂CN, fraction, obtained in 57.0% yield, boiled at 45° at 1 mm.

*Example 6.*—A reaction mixture consisting of 142 parts of formaldehyde cyanohydrin, 277 parts of di(methoxyethyl) formal and 2 parts of sulfuric acid was fractionated until methoxy ethanol stopped distilling from the mixture. After neutralizing the mixture, as described above, fractionation was continued. The (methoxyethoxymethoxy) acetonitrile,

CH₃OCH₂CH₂OCH₂OCH₂CN fraction, obtained in 67% yield, boiled at 70° at 3 mm.

*Example 7.*—A mixture of diisobutyl formal (1 mol), acetaldehyde cyanohydrin (1 mol), and sulfuric acid (2 cc.) was heated on an oil bath and the isobutanol formed in the reaction was distilled from the mixture at reduced pressure (55 mm.) during the reaction. After a 6 hour reaction period the product, alpha (isobutoxymethoxy) propionitrile

C₄H₉OCH₂OCHCN was washed with water and distilled at 3 mm.

*Example 8.*—Acetaldehyde cyanohydrin was heated to a temperature between 60 and 90° C. with excess methylal and sulfuric acid catalyst in a pressure still operating under 30# gauge pressure. Methylal and methanol were distilled from the reaction mixture during the reaction at 77° C. at this pressure. The pressure was released and the mixture neutralized as described above and after distillation a conversion of 45% to (methoxymethoxy) propionitrile,

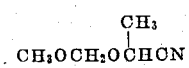

CH₃OCH₂OCHCN was realized.

The above cyanoacetals are valuable intermediates for the preparation of compounds for use in the textile and allied industries; intermediates for the preparation of ethanol amine, diaminoacetals, amides of formic and hydroxyacetic acids; they are attractive softeners and plasticizers for regenerated cellulose, cellulose ethers and esters and the amides of the long-chain acids as well as a majority of their amines are surface acting agents.

We claim:

1. A process for the preparation of an alkoxymethoxy alkane nitrile which comprises reacting a formal with an aldehyde cyanohydrin, the reaction being effected in the presence of an acidic type catalyst.

2. A process for the preparation of (methoxymethoxy) alkylnitrile which comprises reacting methylal with an aldehyde cyanohydrin in the presence of an acidic type catalyst.

3. A process for the preparation of (methoxymethoxy) acetonitrile, which comprises heating formaldehyde cyanohydrin and methylal in the presence of sulfuric acid as the catalyst.

4. A process for the preparation of (methoxymethoxy) acetonitrile which comprises boiling for approximately five hours a mixture containing the following approximate composition: 288 parts of formaldehyde cyanohydrin, 1648 parts of methylal (as a methanol azeotrope containing eight parts of methanol and 92 parts of methylal) and 10 parts of sulfuric acid, thereafter neutralizing the catalyst by the addition of sodium methoxide until colorless to phenolphthalein and finally distilling the (methoxymethoxy) acetonitrile from the reaction product.

5. An (alkoxymethoxy) acetonitrile having the formula ROCH₂OCH₂CN.

6. (Methoxymethoxy) acetonitrile having the formula CH₃OCH₂OCH₂CN and a boiling point of 66° C. at 23 mm. pressure.

7. A process for the preparation of (ethoxymethoxy) acetonitrile, which comprises heating formaldehyde cyanhydrin and diethyl formal in the presence of sulfuric acid as the catalyst.

8. (Ethoxymethoxy) acetonitrile having the formula C₂H₅OCH₂OCH₂CN and a boiling point of approximately 45° C. at 1 mm. pressure.

DONALD JOHN LODER.
WALTER MARTIN BRUNER.